Figure 1:
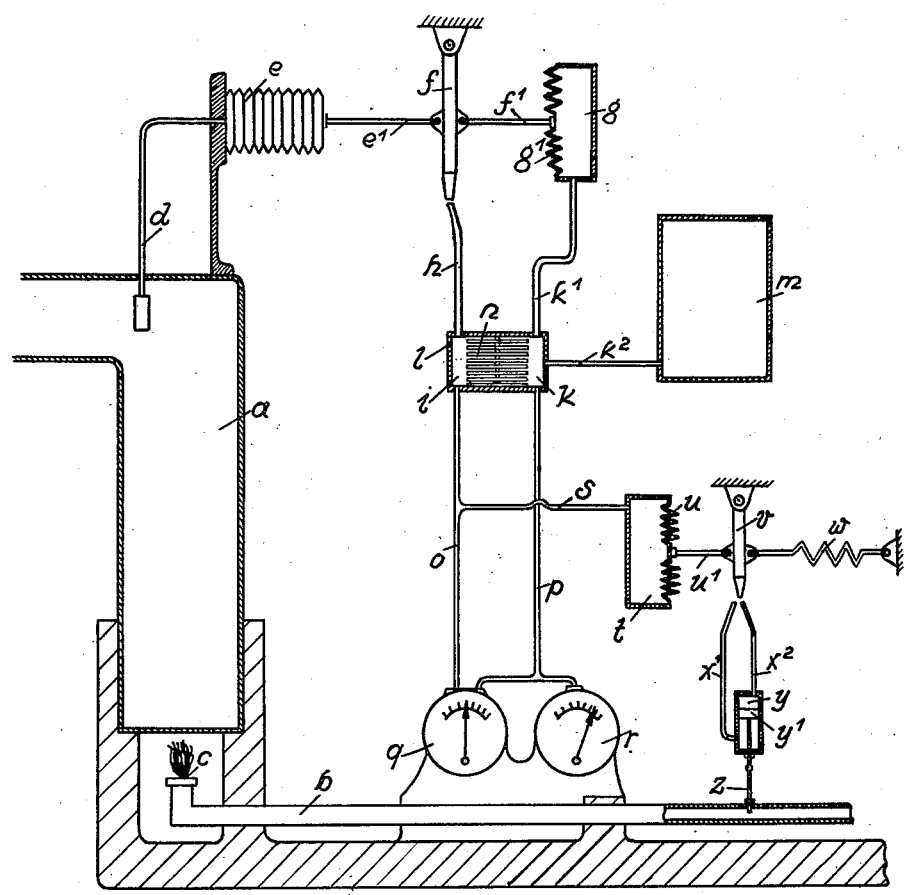

Aug. 1, 1933.    G. WÜNSCH    1,920,827

METHOD OF AND APPARATUS FOR REGULATING OR GOVERNING PHYSICAL CONDITIONS

Filed Sept. 21, 1927

Patented Aug. 1, 1933

1,920,827

UNITED STATES PATENT OFFICE 1,920,827

METHOD OF AND APPARATUS FOR REGULATING OR GOVERNING PHYSICAL CONDITIONS

Guido Wünsch, Steglitz near Berlin, Germany, assignor to Askania-Werke Akt. Ges. Vorm. Centralwerkstatt Dessau und Carl Bamberg-Friedenau, Berlin-Friedenau, Germany Application September 21, 1927, Serial No. 221,122, and in Germany September 21, 1926

11 Claims. (Cl. 236—26)

REISSUED

This invention relates to methods of and apparatus for regulating or governing physical conditions. Such methods and apparatus are known, but so far as I am aware all those heretofore used suffer from the disadvantage that an appreciable time interval elapses between the instant at which the regulating or governing action is initiated and the time when said action becomes effective. During this time interval the regulating or governing action may be subjected to influences that impair its accuracy and effectiveness, such impairment being greater or less according to the length of said time interval. Also the corrective action may under certain conditions reach a point in excess of that required, in other words overshoot the mark, before it is arrested, so that further corrective action in the opposite direction becomes necessary. This puts an unnecessary burden upon the regulating or governing means employed and results in an unnecessary waste of the supply of energy productive of the physical condition to be regulated. Thus in the case of the regulation of a well-known physical condition, for instance temperature, the temperature of an oven for example, when the desired temperature is exceeded, the source of heat, the supply of gas for instance, is reduced, while on the other hand when the temperature falls below that required, said supply is increased. The temperature of an oven, however, changes very slowly, so that when, due to a fall below or a rise above the desired temperature, the supply of gas is increased or diminished respectively, an appreciable time interval will necessarily elapse before the desired temperature is restored, the length of said time interval varying with the capacity of the oven. When the temperature falls below the temperature desired and the supply of gas is accordingly increased as above stated, the time interval required to restore the temperature to the desired degree in many instances is such that the amount of gas supplied for this purpose far exceeds that required normally to maintain the correct temperature, so that the temperature will rise above that desired and the regulator is compelled to operate again to reduce the supply of gas. This oscillating operation before the right temperature in the oven is obtained or restored may continue some time which makes for unnecessary waste of gas and imposes an extra tax on the regulating or governing apparatus.

One of the objects of the present invention is to provide a method of and apparatus for regulating or governing physical conditions, which shall be reliable and accurate in operation and which shall function without waste, eliminating the objectionable features above set forth.

Other objects of the invention will appear from the following description.

The invention and its aims and objects will be readily understood from the following description of the best mode and manner at present known to me for putting my invention into execution, and of a diagrammatic representation in the accompanying drawing of one illustrative apparatus for that purpose, the true scope of the invention being pointed out in the appended claims.

The apparatus shown in the drawing is for the regulation or governing of temperature, but it is to be understood that my invention is not to be considered as limited to the regulation or governing of that particular physical condition, but that it is equally applicable to the governing or regulation of pressure and other physical conditions.

Referring to the drawing, $a$ is a boiler or an oven in which it is desired to maintain a certain definite temperature by means of the burner $c$ fed with fuel through a pipe $b$. A fluid thermostat $d$ comprising the heat sensitive means is provided in the boiler and sets up a pressure in a diaphragm chamber or bellows $e$ which is connected with a pivoted jet nozzle $f$. A continuous stream of fluid under pressure, preferably air, is caused to flow through this jet nozzle from a suitable source of supply, not shown, the air from said nozzle entering a tube $h$ to a greater or less extent, depending upon the position of said nozzle. The air entering the tube $h$ passes to a chamber $i$—$k$ and exerts pressure on the diaphragm $g^1$ of a diaphragm chamber $g$, this pressure continuing to increase until the force on the diaphragm equalizes the force exerted by the thermostat $d$ or bellows $e$. If the temperature and therewith the fluid pressure in $e$ is constant, then the entire arrangement will remain in equilibrium and the same pressure will prevail in $g$, $k$ and $i$, said pressure being indicated by the gauge $r$. If, however, the temperature rises, then the pressure in $e$ also rises and air under pressure flows through the resistance chambers $i$—$k$ in the direction $i$—$k$. The quantity of air flowing from $i$ to $k$ and, therefore, the pressure differential between $i$ and $k$ can be regulated by a reservoir chamber $m$ connected as shown to the chamber $k$. The more rapid the temperatures changes in the boiler or oven, the quicker the pressure will change in $e$, and more air will be forced into $g$ and $m$. By means of a device, for example a capillary resistance $n$ of conventional construction inserted between $i$ and $k$, a pressure difference will be caused to exist between $i$ and $k$ and this pressure difference will vary in proportion to the flow of air through the capillary tubes and can be read from the pressure difference meter $q$. This pressure difference is proportional to the speed with which the pressure changes in $g$ (and $m$) and therefore to the speed or rate of change of the temperature in the boiler or oven $a$.

In the illustrative embodiment of the invention the rise in pressure indicated at $r$ is proportional to the rise in temperature in the boiler or oven, and the difference in pressure indicated at $q$ is proportional to the rate of change of the temperature in said boiler or oven.

In the illustrative embodiment of the invention the amount of heating gas delivered by the pipe $b$ is governed by a throttle slide $z$ operated by a piston $y^1$ operating in a cylinder $y$. The piston $y^1$ is operated by a second jet nozzle $v$ to which air under pressure is continuously supplied from a suitable source not shown, said jet nozzle being pivoted similarly to the jet nozzle $f$ and cooperating with tubes $x^1$ and $x^2$ which communicate with opposite ends of the cylinder $y$ respectively. According as the diaphragm $u$ swings said jet nozzle $v$ in the one or the other direction about its pivot compressed air will flow from said nozzle to a greater or less degree into the one or the other of the two tubes $x^1$ and $x^2$. Displacement of the diaphragm $u$ is effected against the action of a spring $w$ under the effect of pressure in the diaphragm chamber $t$, which chamber is connected to the chamber $i$ by a tube $s$. Increase in pressure causes the jet tube to force air under pressure into the tube $x^2$, resulting in downward movement of the piston $y^1$ and closing movement of the throttle slide $z$, thus decreasing the flow of gas to the burner, while decrease of pressure in said diaphragm chamber moves said jet nozzle to supply compressed air to the tube $x^1$ thus raising the piston $y^1$ and opening the throttle slide $z$ to increase the flow of gas to the burner $c$.

If for any reason the temperature in the oven begins to rise rapidly, the jet nozzle $f$ will be moved rapidly resulting in a vigorous flow between $i$ and $k$. In the chamber $i$ the pressure increases rapidly sometime before the pressure in $g$ and $k$ becomes noticeably greater. The regulating diaphragm $u$ will thus operate to throttle the supply of gas considerably until the pressure in $i$ regains its original value. On the other hand if for any reason the temperature begins to fall, the jet tube $f$ will be moved in the opposite direction resulting in a diminished flow between $i$ and $k$. In the chamber $i$ the pressure will decrease rapidly sometime before the pressure in $g$ and $k$ becomes noticeably less. The regulating diaphragm $u$ will thus operate to increase the supply of gas considerably until the pressure in $i$ regains its original value.

It will thus be seen that a force proportional to the change in the physical condition to be regulated and a second force proportional to the rate of change in said physical condition are used to regulate or govern said physical condition, the sum or resultant of said two forces exerting a regulating or governing action for this purpose upon the supply of energy productive of said physical condition. So far as I am aware this is novel and results in a very sensitive, stable and damped regulation since the regulating or governing means is influenced not only by the magnitude of the condition to be regulated but also by the rate of change of said physical condition.

It will be understood that the resistance $n$ must be kept within such bounds that it will not hinder the flow of pressure fluid to and from the chamber $g$ that is necessary for maintaining the balanced condition of the nozzle $f$.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

I claim:

1. In apparatus for regulating or governing temperature in an enclosed space, in combination, means to heat the contents of said space; a pressure fluid operated regulator for said heating means; means to supply pressure fluid to operate said regulator; fluid pressure responsive means connected to control the application of the pressure fluid which operates the regulator; a source of controlling pressure fluid communicating with said pressure responsive means; pressure operated governing means influenced by the temperature in said space and connected to govern the application of the controlling pressure fluid, and a second pressure fluid responsive means also communicating with said source of controlling pressure fluid connected to act on the source of controlling pressure fluid in opposition to the said governing means, the construction and arrangement being such that actuating or adjusting movement of said source of controlling pressure fluid imparted by the opposed governing means and said second pressure fluid responsive means results in said first mentioned fluid pressure responsive means controlling the operation of said regulating means in response to a fluid pressure which is the resultant of a pressure proportional to the change in temperature in said space and a pressure proportional to the rate of change of the temperature.

2. In apparatus for regulating or governing temperature in an enclosed space, in combination, means to heat the contents of said space; a pressure fluid operated regulator for said heating means; means to supply pressure fluid to operate said regulator; pressure responsive means controlling the application of pressure fluid, a source of controlling pressure fluid communicating with said pressure responsive means; pressure operated governing means influenced by the temperature in said space and connected to govern the application of the controlling pressure fluid, and a second pressure fluid responsive means also communicating with said source of controlling pressure fluid and connected to act on the source of controlling pressure fluid in opposition to said governing means; flow resisting means between said source of controlling pressure fluid and said second pressure fluid responsive means; and a fluid chamber communicating with said second pressure fluid responsive means intermediate the latter and said flow resisting means, the entire construction and arrangement being such that the opposed action of the governing means and the second pressure fluid responsive means on the source of controlling pressure fluid imposes a pressure on the first mentioned pressure fluid responsive means which is the resultant of a pressure proportional to the change in temperature of the space to be heated and a pressure proportional to the rate of said change.

3. In regulating or governing apparatus of the character described, in combination, a pressure fluid operated regulator for a condition to be regulated; means to supply pressure fluid to said regulator; pressure fluid responsive means connected to control the operation of said regulator; a source of controlling pressure fluid communicating with said pressure responsive means; force exerting means responsive to changes in magnitude of the condition to be regulated and connected to control the application of the pressure fluid from said source; a second pressure fluid responsive means also communicating with said source of pressure fluid and connected to oppose the action of said force exerting means on said source of pressure fluid; and flow resisting means between said source of pressure fluid and said second responsive device, the construction and arrangement being such that actuating or adjusting movement of said source of pressure fluid imparted by said opposed force exerting means and said second pressure fluid responsive means results in said first mentioned fluid pressure responsive means controlling the operation of said regulator in response to a resultant pressure influenced by a pressure proportional to the change in the physical condition to be regulated and influenced by a second pressure proportional to the rate of change of said physical condition.

4. Temperature regulating or governing apparatus comprising, in combination, a source of heat for the appliance in which the temperature is to be regulated or governed; a throttling member in the source of heat supply; a fluid pressure operated servo-motor connected to operate the throttling member; fluid pressure responsive means connected to control the operation of the servo-motor; and means for supplying fluid under pressure to said fluid pressure responsive means at a pressure influenced by both the temperature to be governed and the rate of change of said temperature, including a source of fluid pressure, a chamber communicating with the source of pressure and with the pressure responsive means, a second chamber communicating with said first named chamber; flow resisting means between said chambers to provide a difference in pressure in said chamber proportional to the quantity of pressure fluid flowing therethrough; and controlling means connected to vary the pressure fluid supply to said first named chamber comprising a measuring system exerting a force proportional to the instant temperature to be governed and a measuring device communicating with the second chamber exerting an opposing force proportional to the pressure in said second named chamber.

5. Temperature regulating or governing apparatus comprising, in combination, a source of heat for the appliance in which the temperature is to be regulated or governed; a throttling member in the source of heat supply; a fluid pressure operated servo-motor connected to operate the throttling member; fluid pressure responsive means connected to control the operation of the servo-motor; means for supplying fluid under pressure to said fluid pressure responsive means at a pressure influenced by both the instant temperature to be governed and the rate of change of said temperature, including a source of fluid pressure, a chamber communicating with the source of pressure and with the pressure responsive means, a second chamber communicating with said first named chamber, flow resisting means between said chambers to provide a difference in pressure in said chamber proportional to the quantity of pressure fluid flowing therethrough; and controlling means connected to vary the pressure fluid supply to said first named chamber comprising a measuring system exerting a force proportional to the instant temperature to be governed and a measuring device communicating with the second chamber exerting an opposing force proportional to the pressure in said second named chamber, and an auxiliary pressure chamber communicating with said second chamber.

6. In regulating or governing apparatus of the character described, in combination, a fluid pressure operated regulator for a condition to be regulated; a source of fluid pressure to actuate said regulator; fluid pressure responsive means connected to control the application of the fluid pressure which actuates the regulator; a second source of fluid pressure connected to supply pressure to said fluid pressure responsive means; means responsive to changes in the condition to be regulated connected to control the application of pressure from said second source of fluid pressure; a second pressure responsive means communicating with said second source of pressure and connected to oppose the action of said condition responsive means on said second source of fluid pressure; and means to impede the passage of fluid pressure from said second source of fluid pressure to said second fluid pressure responsive means.

7. In regulating or governing apparatus of the character described, in combination, a regulator for a condition to be regulated; operating means therefor; fluid pressure operated means responsive to variations in fluid pressure to control said operating means; fluid pressure supplying means for said fluid pressure operated means; actuating means responsive to changes in the condition to be regulated connected to actuate said fluid pressure supplying means and vary the amount of pressure fluid supplied thereby to said fluid pressure operated means; opposing means, responsive to pressure fluid supplied by said pressure fluid supplying means, to influence said fluid pressure supplying means in opposition to said actuating means; and means to impede the passage of fluid pressure to said opposing means.

8. In apparatus of the character described, in combination, a regulator for a condition to be regulated; operating means connected to the regulator; a source of energy connected to control said operating means; governing means connected to control the application of the energy including a device responsive to changes in the condition to be regulated and opposing means controlled by the source of energy and acting upon the source of energy in opposition to the action of the governing means; and means to render the action of the opposing means at first unequal to the action of the governing means but to permit the action of said opposing means gradually to equal the action of said governing means.

9. In apparatus for regulating temperature in a space, in combination, heat supplying means; a regulator therefor; operating means for the regulator; a source of energy connected to control the operating means; governing means influenced by changes in the temperature in said space and connected to govern the application of said source of energy; opposing means controlled by the applied energy and acting upon the source of energy in opposition to the action thereon of said governing means; and means to render the action of the opposing means at first unequal to the action of the governing means but to permit the action of said opposing means gradually to equal the action of said governing means.

10. That method of regulating or governing temperature in a heated space which comprises delivering fluid under pressure from a source of substantially constant pressure fluid to a governing chamber; varying the quantity of the fluid delivered to the governing chamber in response to changes in temperature in the heated space; simultaneously and gradually modifying the fluid pressure in the governing chamber as the temperature in the heated space changes; and applying the modified pressure to control the supply of heat to said space.

11. That method of regulating or governing temperature in a heated space which comprises directing a jet of fluid under substantially constant pressure into a governing chamber; controlling the jet to vary the quantity of fluid delivered to the chamber in response to changes in temperature in the heated space; modifying the fluid pressure in the governing chamber by resistance to flow of the fluid as the temperature in the heated space changes; and applying the modified pressure in the governing chamber to control the supply of fuel which heats said space.

GUIDO WÜNSCH.